United States Patent
Wanda et al.

(10) Patent No.: US 8,184,907 B2
(45) Date of Patent: May 22, 2012

(54) IMAGE PROCESSING METHOD AND IMAGE PROCESSING APPARATUS

(75) Inventors: Koichiro Wanda, Yokohama (JP); Toshikazu Ohshima, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/208,215

(22) Filed: Aug. 11, 2011

(65) Prior Publication Data

US 2011/0298825 A1  Dec. 8, 2011

Related U.S. Application Data

(63) Continuation of application No. 12/117,560, filed on May 8, 2008, now Pat. No. 8,019,176.

(30) Foreign Application Priority Data

May 16, 2007 (JP) ................................. 2007-130435

(51) Int. Cl.
*G06K 9/00* (2006.01)
(52) U.S. Cl. ........ 382/178; 382/282; 382/284; 345/419; 345/629; 345/633

(58) Field of Classification Search .................. 382/173, 382/282, 284; 345/419, 629, 633
See application file for complete search history.

(56) References Cited

U.S. PATENT DOCUMENTS

| | | | | |
|---|---|---|---|---|
| 7,199,807 | B2 * | 4/2007 | Kobayashi et al. | 345/633 |
| 7,212,687 | B2 * | 5/2007 | Ohshima | 382/284 |
| 7,292,255 | B2 * | 11/2007 | Doan et al. | 345/629 |
| 7,427,996 | B2 * | 9/2008 | Yonezawa et al. | 345/629 |
| 7,928,977 | B2 * | 4/2011 | Tanimura et al. | 345/419 |

* cited by examiner

*Primary Examiner* — Wesley Tucker
(74) *Attorney, Agent, or Firm* — Canon U.S.A., Inc. I.P. Divison

(57) ABSTRACT

A CG image having a transparency parameter is superimposed on a shot image, which is an image picked up by an image-pickup device, to obtain a combined image. The combined image is displayed in a combined-image-display region. In the combined image, a mask region of the CG image is set based on parameter information used to extract a region of a hand. The transparency parameter of the CG image is set based on a ratio of the size of the region of the CG image excluding the mask region to the size of the shot image. By checking the combined image, which is displayed in the combined-image-display region, the user can set the parameter information by a simple operation.

12 Claims, 5 Drawing Sheets

IMAGE PROCESSING METHOD AND IMAGE PROCESSING APPARATUS

CROSS REFERENCE OF RELATED APPLICATIONS

This application is a continuation of U.S. application Ser. No. 12/117,560 filed May 8, 2008 which claims the benefit of Japanese Application No. 2007-130435 filed May 16, 2007, both of which are hereby incorporated by reference herein in its entirety.

BACKGROUND OF THE INVENTION

1. Field of the Invention

The present invention relates to an image processing method and an image processing apparatus for combining a virtual image with a shot image to obtain a combined image and displaying the combined image.

2. Description of the Related Art

In the video production field, the chroma key technology is used in which a specified region is extracted from a live image picked up by a video camera, and in which the specified region is combined with a computer-graphic (CG) image.

Additionally, in a field of mixed reality (MR) in which a real space and a virtual space are naturally combined together such that the user does not feel that the real space and the virtual space are different in MR, the chroma key technology is also used. In the MR field, in order to extract only an object region from a shot image and display the object region, a technology has been suggested in which information is extracted from the shot image to generate, for example, a look-up table (LUT) that is a type of parameter information used to extract the object region.

An MR apparatus combines an image obtained in the virtual space, which is rendered using computer graphics, with an image obtained in a real space, which is picked up by an image-pickup apparatus, such as a camera, to obtain a combined image. The combined image is displayed on a display device, such as a head-mounted display (HMD), thereby presenting MR to a user.

When a CG image of a virtual object is superimposed and displayed on a shot image obtained in the real space, a combined image is generated without superimposing the CG image in a region of, for example, a hand of the user included in a region of the shot image. This is performed using an object-region-extracting process. With this process, when the hand of a user wearing the HMD is extracted as an object, the hand is not hidden by the virtual object in the combined image. Accordingly, MR that can provide a feeling more similar to a feeling obtained in the real space for the user can be presented.

Next, the object-region-extracting process in the related art used to present MR to the user will be briefly described.

In order to extract an object region, color information concerning the hand is set in advance as parameter information, such as the LUT. The color information concerning the object upon which a CG image is not to be superimposed or displayed is registered, for example, in the following methods. One method is capturing an image showing the object picked up by a camera, representing values of pixels as a distribution on a CbCr plane, and specifying a coordinate range of each axis of a color space. Another method is sampling points for each axis in the color space, and registering values indicating whether or not the sampled points represent the object, which is called the LUT.

Next, a process in which the user wearing the HMD experiences an MR image obtained using the object-region-extraction process will be briefly described.

The image-pickup apparatus, which is the HMD worn by the user, picks up an image showing the region in front of the user wearing the HMD to generate a shot image. The shot image includes a background image that the CG image is to be combined with, and an image of the hand of the user.

After the shot image is captured, the CG image to be superimposed and displayed is generated. The CG image is a CG image excluding the region of the hand of the user, i.e., the object region. By superimposing the CG image, which does not include the region of the hand, upon the shot image, a combined image, upon which the CG image excluding the object region is superimposed and displayed, can be generated.

In the related art, a combined image is generated with a performance of the object-region-extracting process using a combination of the LUT, a process in which a range of luminance value is specified in a shot image, a noise reduction process, in which pixels having a region smaller than a predetermined size are recognized as noise and not rendered in a CG image, and so forth. By generating the combined image in such a manner, MR more similar to reality can be provided for a user.

As a method for setting the parameter information used to generate the combined image using the object-region-extracting process, a method in which a luminance range is specified, or a method in which a setting of the number of pixels is specified in the noise reduction process can be used. However, use of another method is necessary. The method is specifying a range of a shot image by dragging a mouse, and registering colors of pixels included in the specified region as color information specifying a region upon which a CG image is not to be superimposed or displayed in the LUT. As an example of an operation method for performing such a registration in the LUT, a method can be used in which colors are specified directly in a CbCr color space.

However, the operation method was difficult for a general user, who lacks expertise or is not familiar with how to deal with colors, to understand the contents of the operation and a display of the color space for the operation. Accordingly, a general-user-friendly operation method has been suggested. The general-user-friendly operation method is specifying the object upon which a CG image is not to be superposed or displayed, such as the hand described in the object-region-extracting process, using colors of the shot image while the shot image is being displayed, and providing a specification of the colors for an MR-presenting apparatus.

Although an operability in the registration of colors in the LUT using the operation of selecting an image region in the shot image has been improved to some extent, the operation has a disadvantage described below.

An appropriate value obtained by adjusting a parameter used to determine a region of the CG image that is not to be superimposed on the shot image or the object region is determined by using subjective sensation of the user while the user is checking a positive effect of a setting on the combined image. Accordingly, the user needs to repeat the registration and deletion of the color information of the LUT so that the parameter can be approached to the appropriate value.

With the technology disclosed in Japanese Patent Laid-Open No. 2005-228140, operations for extracting the color information from an image can be easily performed. However, because the parameter needs to be slightly adjusted as the operations are in progress, an appropriate image display is necessary in accordance with the progress of the operations.

There is no image-displaying method for displaying the shot image, the combined image, and an image to be processed such that these images can be related to one another. For a slight adjustment of the parameter, the user needs to have a task of switching the operations or the displays of the images one by one.

The registration or deletion of the color information of the LUT is an operation in which a slight adjustment is necessary. However, when a combined image is generated using both settings of other parameter information and the color information of the LUT, it is necessary that the generation of the combined image be performed so that images with an overall positive effect caused by both the settings of other parameter information and the color information of the LUT can be simply applied to the combined image. However, there is no technology in which an image display can be changed on the basis of a mask region of a CG image while the combined image is being generated using the positive effect of the current settings.

When the color information is extracted as the parameter information used in the object-region-extracting process from the shot image, a user interface (UI) for user operations is used because, with the UI, the user can check a positive effect on the combined image on an image display, whereby the parameter can be approached to an appropriate value. However, because of the above-described technical problems, the UI has disadvantages described below.

There is no image-displaying method for displaying the shot image, the combined image, and an image to be processed such that these images can be related to one another in accordance with the progress of the operations for extracting the color information from an image. For an adjustment of the parameter, the user needs to have a task of continuing the operations while alternately switching and watching displays of the shot image, the combined image, and an image to be processed.

Furthermore, the user needs to have a task of performing an adjustment of the parameter while checking the overall positive effect caused by the settings of parameter information on a display of the combined image. Additionally, the user needs to have a task of manually changing a transparency parameter of a CG image in accordance with the progress of the adjustment of the parameter such that the transparency parameter can be set to an appropriate value.

SUMMARY OF THE INVENTION

The present invention provides an image processing method in which a user can use parameter information, which is used to extract an object from an image, by a simple operation.

The present invention also provides an image processing method in which an appropriate image display can be performed when the parameter information is to be registered.

Furthermore, the present invention also provides an image processing method in which a combined image, which is obtained by combining a CG image with a shot image, can be displayed in a state in which the transparency of the CG image is dynamically changed by the transparency parameter. Thus, the user can easily perform operations for adjusting the parameter information, and regions can be easily distinguished from one another in the image.

According to an aspect of the present invention, an image processing method for combining a virtual image with a shot image to obtain a combined image and displaying the combined image is provided. The image processing method includes the following: capturing a shot image picked up by an image-pickup unit; extracting a predetermined region from the shot image with an extracting unit; generating a virtual image based on a transparency parameter based on a ratio of the size of the predetermined region to the size of the shot image; combining the virtual image with a region of the shot image excluding the predetermined region to obtain a combined image; and displaying the combined image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described below in detail with reference to the accompanying drawings.

Figure 1:
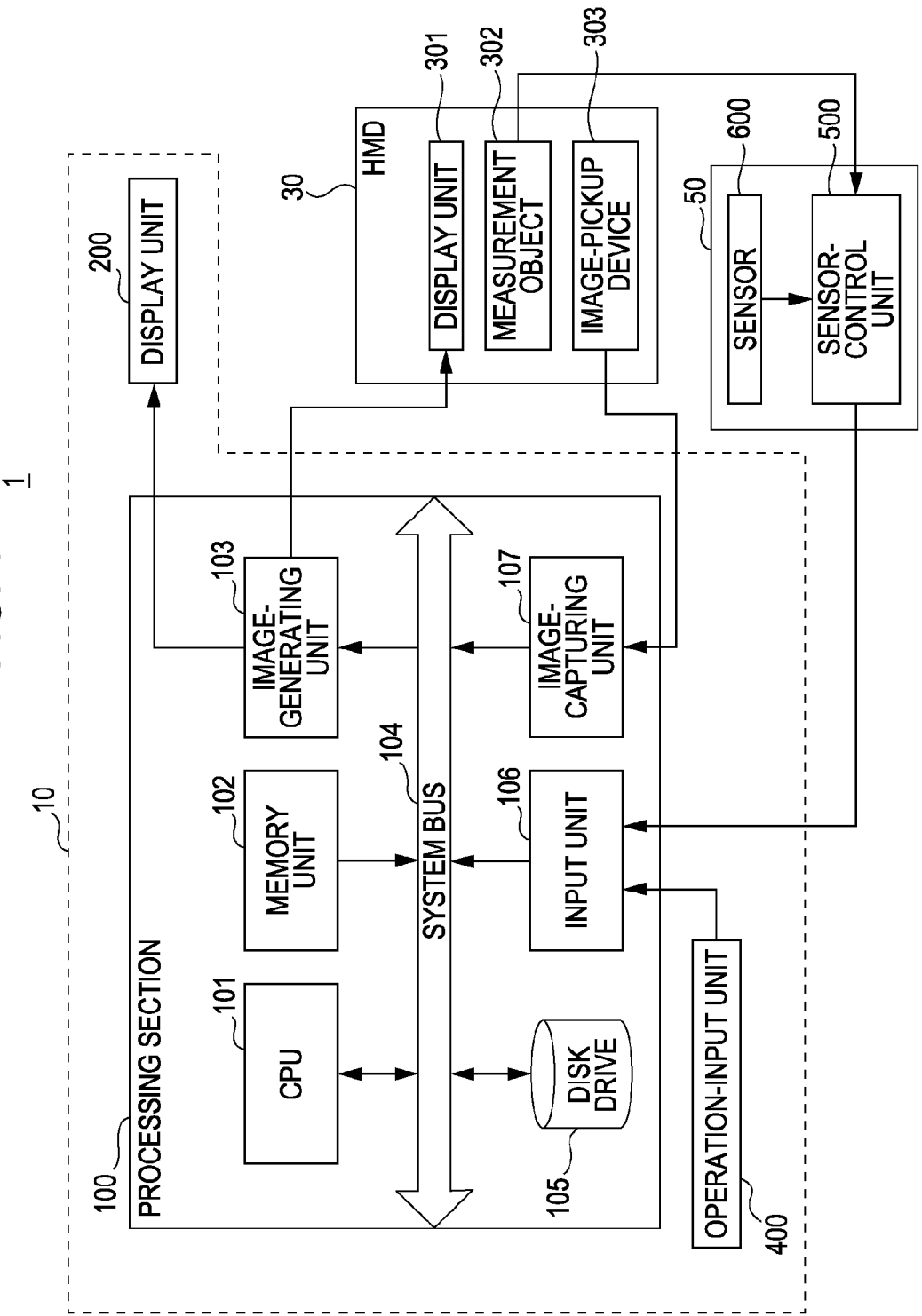
FIG. 1 is a block diagram of a configuration of an image processing system according to an embodiment.

FIG. 1 is a block diagram of a configuration of an image processing system according to an embodiment.

Referring to FIG. 1, an image processing apparatus 1 includes an information processing device 10, an HMD 30, and a position-and-orientation-measurement section 50. The information processing device 10 includes a processing section 100, a display unit 200, and an operation-input unit 400. The position-and-orientation-measurement section 50 includes a sensor-control unit 500 and a sensor 600.

The processing section 100 is implemented by a personal computer or the like. More specifically, the processing section 100 includes a central processing unit (CPU) 101, a memory unit 102 having a random-access memory (RAM), a read-only memory (ROM), and so forth, an image-generating unit 103, a system bus 104, a disk drive 105, an input unit 106, and an image-capturing unit 107.

The CPU 101 exercises overall control of the image processing apparatus 1 on the basis of, for example, a control program for achieving functions described below, which is stored in the memory unit 102. The CPU 101 is connected through the system bus 104 to each of the memory unit 102, the image-generating unit 103, the disk drive 105, the input unit 106, and the image-capturing unit 107 so that the CPU 101 and each of these units can communicate with each other.

The memory unit 102 serves as a main memory. The memory unit 102 temporarily stores the program code of the control program, control information concerning the control program, CG image data, measurement-position data, and so forth via the system bus 104.

The image-generating unit 103 is implemented by a device such as a CG card. Generally, the image-generating unit 103 includes a CG memory not shown in FIG. 1. The CPU 101 executes a program to generate image information, and the image information is written into the CG memory of the image-generating unit 103 via the system bus 104. The image-generating unit 103 converts the image information written in the CG memory to an image signal suitable for a display unit 301, and sends the image signal to the display unit 301. The CG memory is not necessarily included in the image-generating unit 103, and functions of the CG memory may be implemented in the memory unit 102.

The units constituting the processing section 100 are connected to the system bus 104, and communicate with one another via the system bus 104.

The disk drive 105 is implemented by an auxiliary memory, such as a hard disk. The disk drive 105 stores the program code of the control program, the control information concerning the control program, CG object data of a virtual space, position data of the HMD 30, parameter information used in an object-region-extracting process, and data on a setting. The disk drive 105 also stores data on a shot image obtained from the image-capturing unit 107, a parameter for the control of a system, and so forth.

The input unit 106 is implemented by various types of interface devices. For example, when a signal is input as data from a device, which is externally connected to the processing section 100, in the input unit 106, the input unit 106 realizes a function of writing the data through the system bus 104 to the memory unit 102. Additionally, the input unit 106 accepts an instruction provided through the operation-input unit 400 by a user or an input from an external device.

In the image-capturing unit 107, an image signal of a video image or the like is input, as with a capture card. The image-capturing unit 107 writes image data into the memory unit 102 or the CG memory via the system bus 104. The image-capturing unit 107 also writes image data into the disk drive 105 so that the disk drive 105 can store the image data as image data used in this embodiment.

The display unit 200 includes a display device such as a cathode-ray tube display or a liquid-crystal display (LCD). For a user of the image processing system according to the embodiment, the display unit 200 displays operating states of the whole system, a UI for user operations, HMD-position information, and so forth.

The HMD 30 is a head-mounted display that the user of the image processing apparatus wears to experience MR. In the HMD 30, the display unit 301, image-pickup devices 303, and a measurement object 302 whose position and orientation are measured are mounted. Although a configuration of the HMD 30 is described in this embodiment in which only one HMD is used, the configuration can be applied to an embodiment in which a plurality of HMDs are used as in the case of this embodiment.

The display unit 301 includes, for example, two sets of an LCD and an optical system. The two sets of an LCD and an optical system are disposed so as to be individually positioned in front of the right and left eyes of the user. The display unit 301 is used to display images sent from the image-generating unit 103 to present MR to the user.

The image-pickup devices 303 are used to pick up images of a real space that can be observed from the position of a viewing point of the user of the HMD 30. The pickup images are sent as image signals to the image-capturing unit 107.

The measurement object 302 is necessary for the sensor 600 to recognize a position of the HMD 30, and is provided on the HMD 30.

The operation-input unit 400 includes, for example, devices such as a keyboard and a mouse. With the operation-input unit 400, the user can perform operations and issue instructions for the image processing apparatus. The operation-input unit 400 is used mainly to provide operations and instructions such as operations and instructions for activating the system, for ending the system, for controlling the system, and for changing settings, excluding operations for controlling a virtual object during the experience of MR.

The sensor 600 measures a position and orientation of the user of the HMD 30. The sensor-control unit 500 controls the sensor 600 to acquire measurement data using the measurement object 302 and the sensor 600. The position-and-orientation-measurement section 50 is configured to perform the function thereof using the measurement object 302, the sensor-control unit 500, and the sensor 600.

The sensor-control unit 500 calculates information concerning a position and orientation of the measurement object 302 relative to a predetermined reference position on the basis of the measurement data. The sensor-control unit 500 sends the information as a measured value to the input unit 106.

With the above-described configuration, the image processing apparatus can present MR achieved using the object-region-extracting process to the user, and can also provide an image display according to the embodiment.

Next, as an example of an operation of setting parameter information used to extract an object region for a presentation of MR, an example related to an image display of the display unit 200 and an operation using the operation-input unit 400 will be described. Whether or not the sensor 600 is provided, this example can be employed.

The example can also be employed when the sensor 600 measures the image-pickup devices 303 instead of measuring the measurement object 302 as a measurement object.

More specifically, a process will be described in which, in order to set the parameter information used to extract an object region, a combined image is displayed while a transparency parameter of a CG image is being changed in accordance with an operation procedure.

Figure 3:
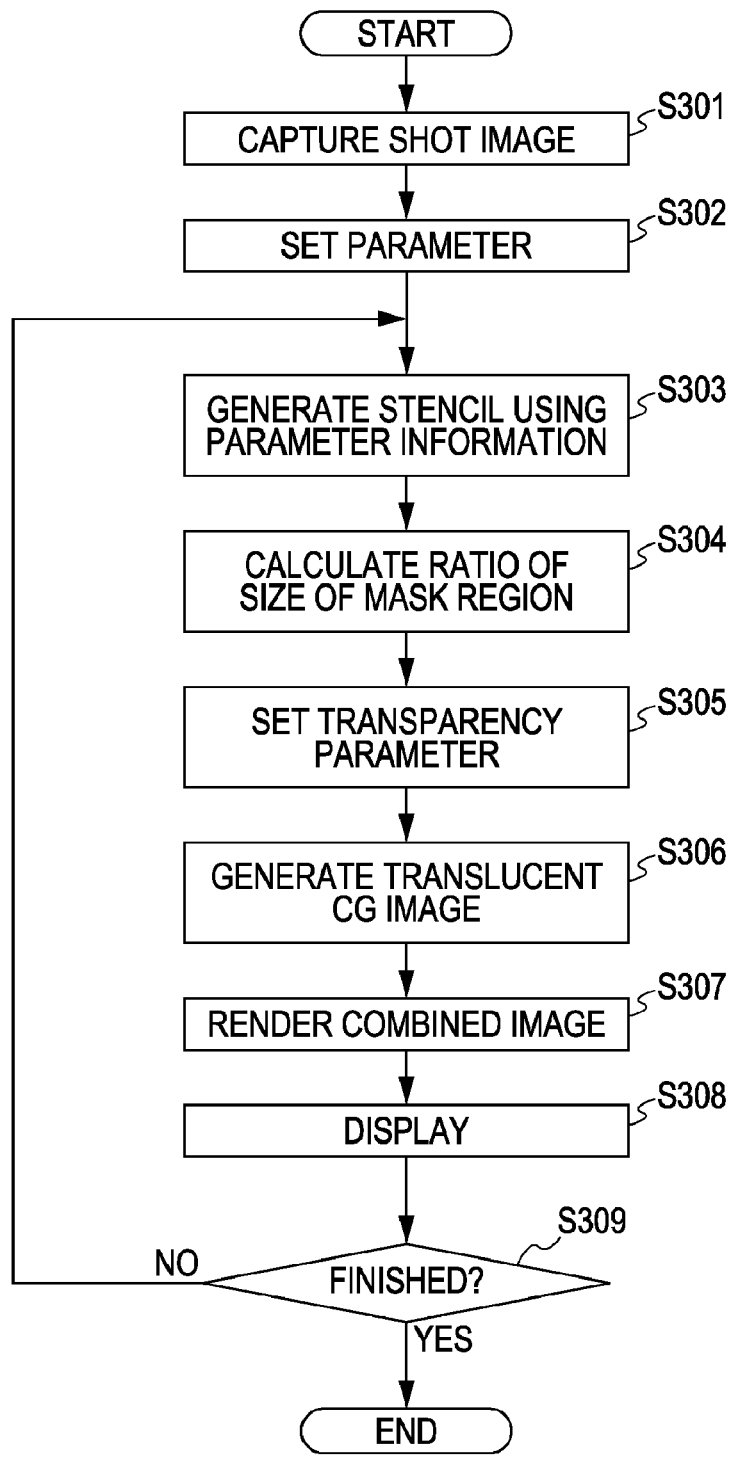
FIG. 3 is a flowchart of processing of operations in the image processing system according to the embodiment.

FIG. 3 is a flowchart of processing of operations according to the embodiment.

FIG. 3 shows a process in which a shot image is picked up, and in which a combined image is displayed on the display unit 200 when the user of the system extracts the object region, in a system configuration shown in FIG. 1.

Figure 2:
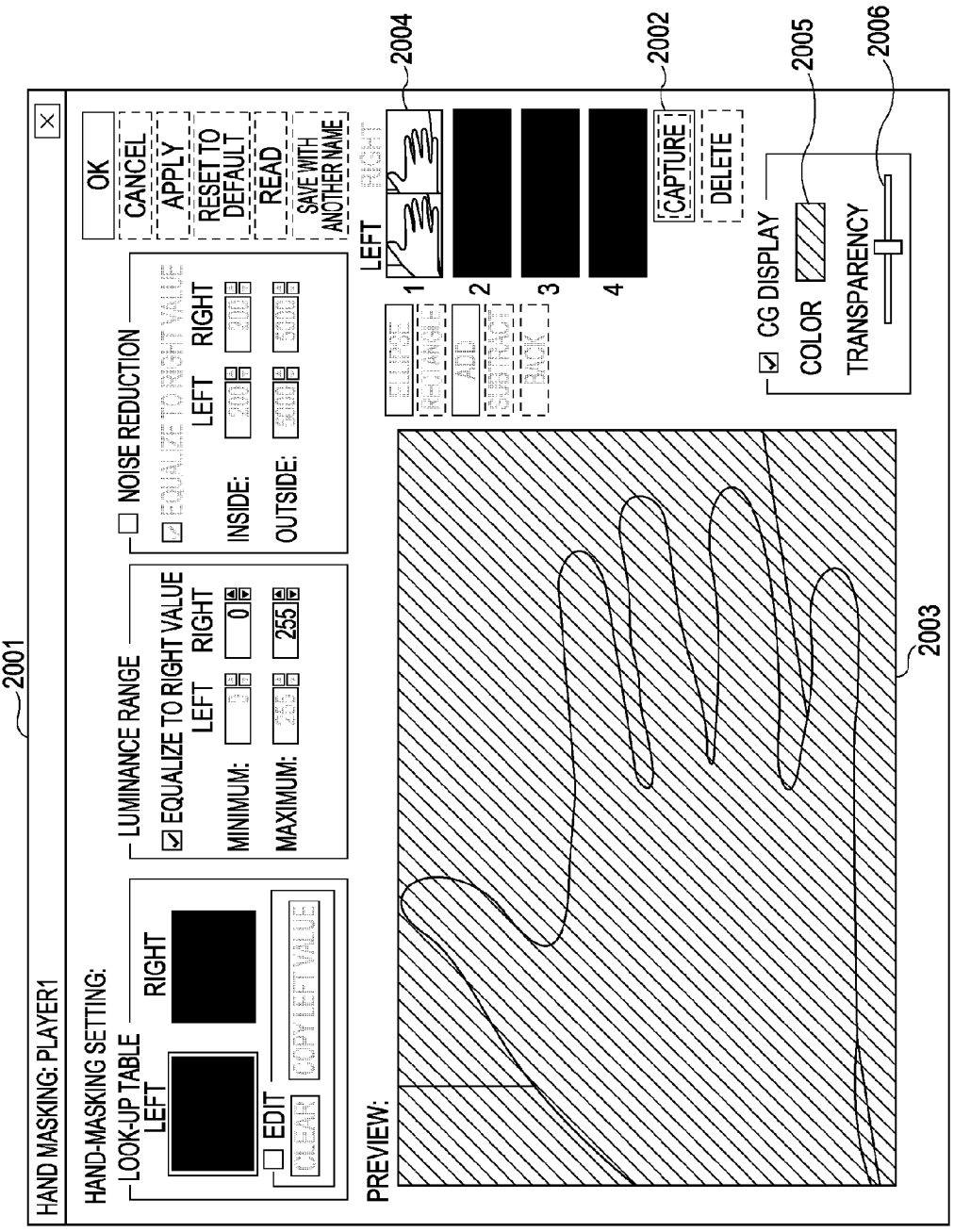
FIG. 2 is an illustration of an example of a user interface according to the embodiment.

As an example in which the combined image is displayed, a UI is shown in FIG. 2. The design of the UI is not limited particularly thereto. In this embodiment, as the operation using the operation-input unit 400, an operation using a mouse of a personal computer is described. However, instead of using the operation-input unit 400, other operation devices such as a keyboard and a gamepad can be used when the same operation can be performed with the operation devices.

Referring to FIG. 3, the image processing apparatus is in a state in which an initialization process has been finished for the whole image processing apparatus.

When the user issues an instruction for capturing shot images using the operation-input unit 400, in step S301, the image-pickup devices 303 pick up the shot images. Then, the image-capturing unit 107 captures the shot images. The shot images that have been captured are stored in the memory unit 102 or the disk drive 105.

Which device captures the shot images in step S301 is determined on the basis of a purpose of the system. The image-pickup devices 303 in the HMD 30 need not be used necessarily. An image-pickup device, such as a general camera, may be used. Additionally, a plurality of shot images may be captured to be optionally used if necessary.

Next, in step S302, the parameter information used to extract the object region is set. The parameter information can be set, for example, using the UI shown in FIG. 2. When a default value is maintained in the system or when a certain value has been already set, a setting stored in the system, such as the default value or the certain value, can be used as it is. In such a case, this step may be omitted. Additionally, in this embodiment, a hand of the user is displayed as an object occupying a predetermined region. However, other portions, such as a head, and an external portion specified by a specified color, may be used.

Next, FIG. 2 will be described. A parameter-setting user interface 2001 used to set the parameter information, which is displayed on the display unit 200, is shown in FIG. 2.

Referring to FIG. 2, a button 2002 is a button used to issue the instruction for capturing the shot images. The user selects the button 2002, for example, using a mouse. By selecting the button 2002, the shot images are captured from the image-pickup devices 303 that are disposed individually on the right and left sides in the HMD 30. Reduced images corresponding to the shot images are displayed in a region 2004 (refer to step S301).

One of the shot images displayed in the region 2004 (an image on the left side in this embodiment) is shown in a combined-image-display region 2003. Additionally, in the combined-image-display region 2003, a CG image having a color specified in a color region 2005 is superposed and displayed. The CG image is stored in a stencil buffer that is a region of the memory unit 102 and that has the same size as that of the shot image. As will be described later, the CG image is displayed in a state in which the transparency of the CG image is changed by the transparency parameter in accordance with the object-region-extracting process. At first, the CG image is displayed in a state with a high transparency. The user can move a slide bar 2006 to set the transparency parameter of the CG image.

Referring back to FIG. 3, in step S303, with reference to default parameter information, which has been already set in the case of the second or later object-region-extracting process, used to extract the object region, a display region and a non-display region (a mask region) of the CG image are set in the stencil buffer. Various types of parameters, such as an LUT, a range of luminance value of the image, and a parameter for the deletion of a region of the CG image whose size is equal to or smaller than a fixed size, can be used to determine the regions of the CG image when a combined image is generated.

When the regions of the CG image are set in the stencil buffer, in step S304, a ratio of the size of the mask region of the CG image, which is generated in the stencil buffer, to the size of the shot image is calculated. Alternatively, a ratio of the size of the CG image to the size of the shot image may be used.

In step S305, on the basis of the ratio of the size of the mask region of the CG image to the size of the shot image, the transparency parameter of the CG image is set. In a general method, as a parameter for the determination of the transparency of the CG image, an α value of a color is set in a range of 0 to 1.0. In step S305, when the size of the mask region, which is generated using the LUT used to extract the object region and is set in the stencil buffer, is as large as the size of the shot image, a parameter indicating a high transparency (a value close to 1.0), which does not indicate a completely transparent state, is set. When the size of the mask region of the CG image is small (a value close to 0), a parameter indicating a low transparency is set.

As described above, the transparency parameter of the CG image can be changed on the basis of the size of the CG image excluding the mask region when the combined image is to be displayed. Accordingly, when the combined image is initially displayed, the transparency parameter of the CG image is set to be high because the size of the region of the CG image is large.

The setting of the transparency parameter of the CG image has been described above. Regarding settings for the CG image, when the transparency parameter is set, color information is generally set at the same time. For example, for image data that needs a determination of colors of the CG image obtained by adjusting red, green, blue, and alpha (RGBA) values, an α value and the colors of the CG image are set at the same time. In this embodiment, arbitrary colors can be set as the colors of the CG image, and the colors of the CG image are not limited thereto. In this step, the colors of the CG image may be changed to colors easy to be distinguished from colors of the shot image, or colors more appropriate for an operation purpose. Additionally, when the transparency parameter is set on the basis of the ratio of the size of the CG image, which is to be superimposed on the shot image, a method may be used in which the colors of the CG images are changed in combination with the determination of the transparency parameter so that the colors of the CG image can be changed on the basis of the transparency parameter and an operation purpose.

As a method for generating a translucent image, there are various methods including a method in which a translucent texture is prepared. Instead of using the above-described method, any method for generating and displaying a translucent image can be used in the embodiment of the present invention as long as the transparency parameter can be set on the basis of the ratio of the size of the CG image to the size of the shot image in the method.

Next, in step S306, the translucent CG image is generated using the CG image stored in the stencil buffer, the transparency parameter, and the color information. The generated translucent CG image is a CG image excluding the object region (the hand of the user in this embodiment), which is extracted on the basis of the parameter information that has been set.

In step S307, the combined image is generated by rendering the shot image, which is captured in step S301, and the CG image, which is generated in step S306, in a frame buffer of the image-generating unit 103. In step S308, the combined image is displayed on the display unit 200. For example, the combined image is displayed as shown in the combined-image-display region 2003 of FIG. 2.

In step S309, in order to change the setting of a parameter such as the setting of the transparency parameter of the CG image and the setting of the color information, the process from step S303 to step S308 is to be repeated. In this case, in the object-region-extracting process, as the setting is approached to a setting of a parameter with which the object region can be properly extracted from the shot image, the ratio of the size of the mask region of the CG image to the size of the shot image is increased.

Normally, when only the object region, for example, only the region having the color information concerning the hand of the shot image, is extracted from the whole region of the shot image, the CG image is not superposed or displayed in the region of the hand. However, when the setting of a parameter is not appropriate, the object region of the combined image is hidden by the CG image.

In other words, there is a non-extracted region of the object region (with a skin color of the hand) of the shot image, and the CG image is superimposed and displayed in the non-extracted region of the hand of the combined image. In order to extract color information that has not been extracted and register the color information in the LUT, the user additionally registers the color information concerning the non-extracted region in the object region of the shot image in the LUT.

In order to specify the non-extracted region of the object, the user can select the above-described region of the combined image which is displayed in the combined-image-display region 2003 and in which the CG image is superimposed and displayed, whereby an operation for the additional registration can be easily performed.

Figure 4:
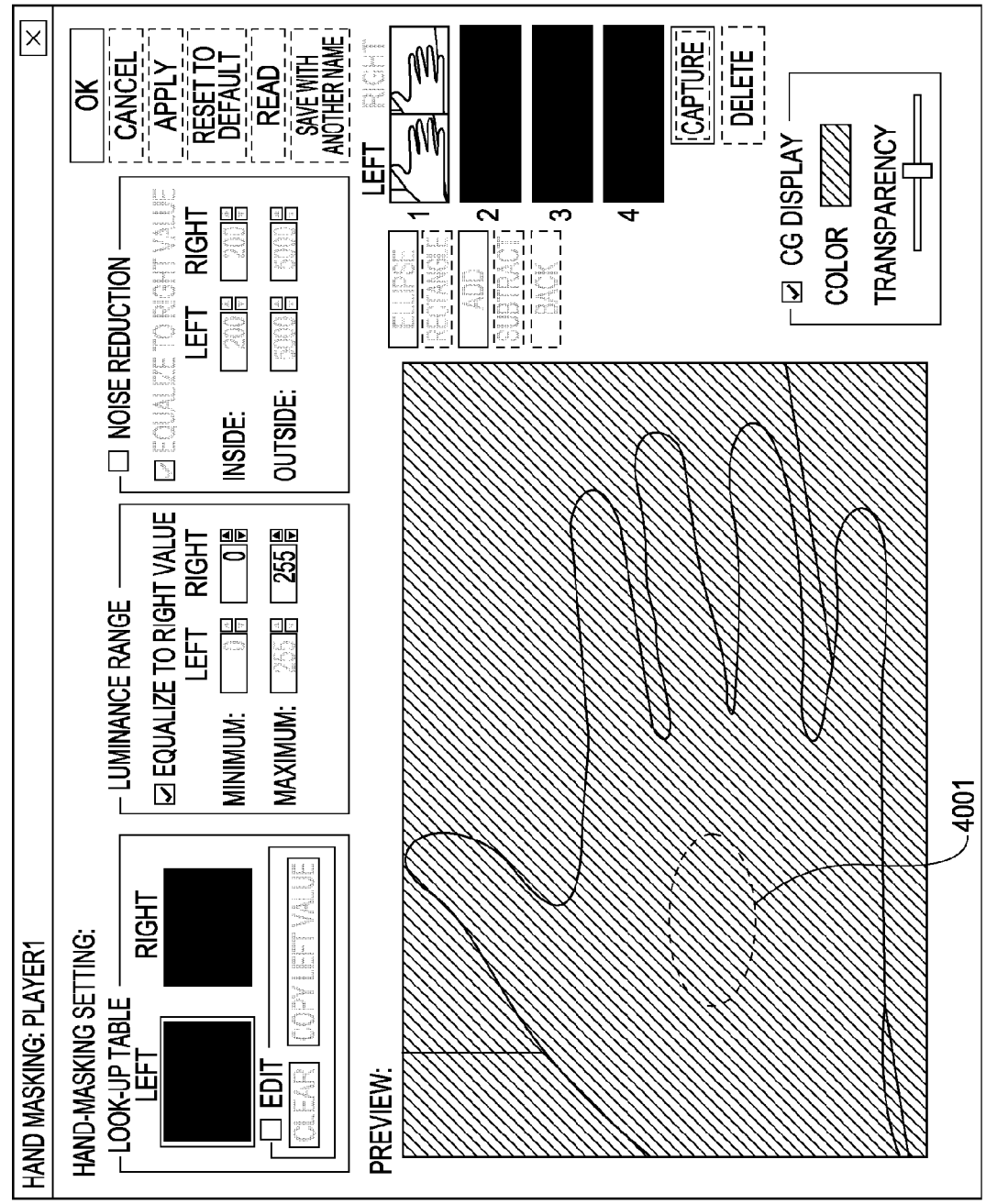
FIG. 4 is an illustration of an example of a user interface according to an embodiment.

More specifically, the non-extracted region, such as a region 4001 shown in FIG. 4, can be specified by controlling a mouse or the like on the object image on which the CG image is superimposed and displayed. When the transparency parameter is high, the operation of specifying a region of the object that is still hidden by the CG image can be easily performed. For example, when most of the shot image is hidden by the CG image, i.e., when the size of the mask region is small, the CG image is displayed with a high transparency as shown in FIG. 4.

When the object-region-extracting process is in progress, the extraction of the object region and the resetting of a parameter are repeated. In such a case, the non-extracted region of the object that is still hidden by the CG image can be made very small. The non-extracted region of the object is approached to an edge between the object and a region in which things other than the object are displayed. As a result, the user needs to perform an operation for a smaller region.

Figure 5:
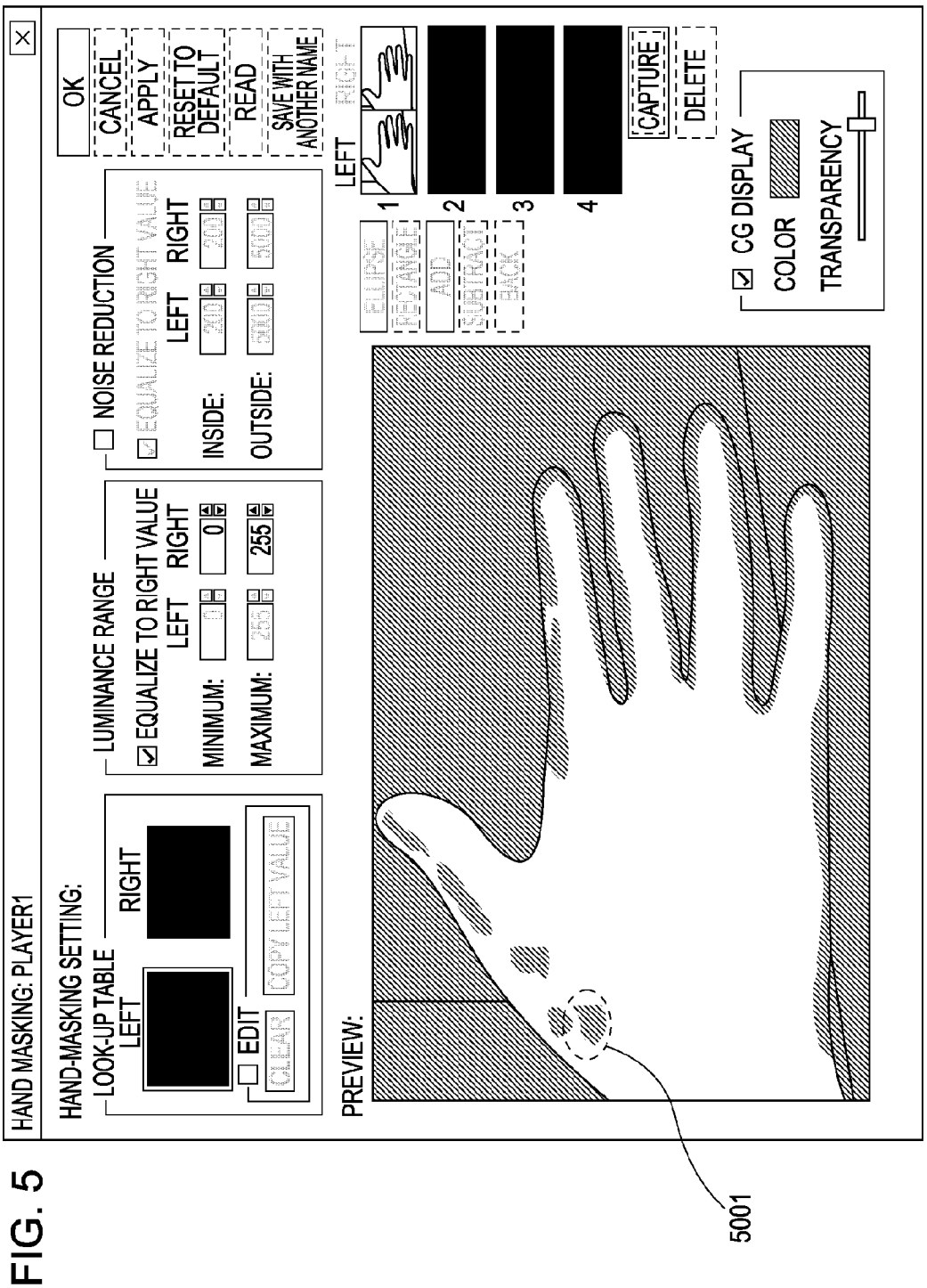
FIG. 5 is an illustration of an example of a user interface according to an embodiment.

In this case, because the CG image is displayed with a low transparency, the non-extracted region is clearly displayed in the object region as shown in FIG. 5. Accordingly, in order that the color information that has not been extracted is extracted from the image region of the hand, which is the object, and is applied to the mask region, a region having the color information that has not been extracted can be easily specified by a mouse or the like as shown in a region 5001 of FIG. 5.

Furthermore, when a region larger than the object region is accidentally masked by the CG image, the color information registered in the LUT can be removed from the LUT. More specifically, the color information concerning the background excluding the object can be specified by the same user operation as that used in a case in which the color information has been added to the LUT. Accordingly, the color information that is unnecessary for the generation of the mask region of the object can be removed from the LUT. In this case, because the size of the mask region is also increased and approached to the size of the shot image, the CG image is displayed with a low transparency. Accordingly, the CG image can be clearly distinguished from the shot image in the background excluding the object.

When the adjustment of a parameter with which the object region can be properly extracted is finished (Yes in step S309) after the resetting of the parameter is repeated, the UI is closed to finish the image display.

Before the image display is finished, depending on a specification of the UI performing a method for providing the image display, the setting may be saved in a file. Alternatively, the setting is maintained in the system, and for example, only the setting may be used when the MR-presenting apparatus displays an MR image.

An example in which the transparency parameter of the CG image is changed has been described in this embodiment. However, instead of using the transparency parameter of the CG image, the CG image can be displayed using a mesh process. More specifically, in another embodiment, the roughness of a mesh or the number of blinks of the CG image can be changed in the same manner as that used in the case of the transparency parameter.

In a case of the mesh process, as in the case of a calculation method for calculating the transparency parameter in step S305, when the ratio of the mask region is low, the roughness of the mesh is set to be high. In contrast, when the ratio of the mask region is high, the roughness of the mesh is set to be low. As a result, the same positive effect as that obtained in the case of the transparency parameter can be obtained.

In a case in which the CG image is blinked, as in the case of the setting of the transparency parameter in step S305, when the ratio of the mask region is low, an interval between blinks are set to be long. In contrast, when the ratio of the mask region is high, the interval between blinks is set to be short. In a combined-image-displaying process of step S308, the combined image is displayed at a blink interval that has been set. As a result, the same positive effect as that obtained in the case of the transparency parameter can be obtained.

Other Embodiments

In another embodiment of the present invention, a computer-readable storage medium, in which the program code of a software program capable of realizing the functions described in the foregoing embodiment is stored, is included in a system or an apparatus. A computer (a CPU or a microprocessor unit (MPU)) of the system or the apparatus reads and executes the program code stored in the computer-readable storage medium, thus realizing the functions.

The program code itself, which is read from the computer-readable storage medium, can realize the functions described in the forgoing embodiment. Accordingly, the computer-readable storage medium, in which the program code is stored, can be provided in accordance with the embodiment of the present invention.

Examples of the computer-readable storage medium, which can provide the program code for the computer, include a floppy disk, a hard disk, an optical disk, a magneto-optical disk, a compact disk read-only memory (CD-ROM), a compact disk recordable (CD-R), a digital-video-disk read-only memory (DVD-ROM), a digital-video-disk recordable (DVD-R), a magnetic tape, a nonvolatile memory card, and a ROM.

In the embodiment, the computer reads and executes the program code, resulting in the realization of the functions described in the forgoing embodiment. In another embodiment, on the basis of instructions of the program code, an operating system (OS), which operates in the computer, or the like may perform a part of or all of processes to realize the functions described in the forgoing embodiment.

According to the embodiments of the present invention, the combined image, which is obtained by combining the CG image with the shot image, can be displayed in a state in which the transparency of the CG image is changed by the transparency parameter. Thus, the user can easily perform operations for adjusting the parameter information.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An image processing apparatus, for editing a parameter of extracting a region which is in association with a real space object from a real image, with visualization of both a border line of a virtual mask image and a border line of the real space object on the real image, the image processing apparatus comprising:

an image acquisition unit configured to acquire a real image obtained by capturing the real space object;

a region extraction unit configured to extract a region which is associated with the real space object from the real image, using an extraction parameter which is set in advance;

a generation unit configured to generate a translucent virtual mask image based on a transparency parameter;

a combining unit configured to generate a composite image of the real image and the translucent virtual mask image, wherein the translucent virtual mask image has been clipped based on the extracted region;

a display unit configured to display the composite image; and a changing unit configured to change the extraction parameter based on an input operation, after displaying the composite image by the displaying unit.

2. The image processing apparatus according to claim 1, further comprising:

an operation input unit configured to input an operation of changing the extraction parameter, after displaying the composite image by the displaying unit;

wherein the changing unit changes the extraction parameter based on the input operation.

3. The image processing apparatus according to claim 1, wherein the region extraction unit extracts a second region which is associated with the real space object from the real image, using the extraction parameter which is changed by the changing unit;

wherein the combining unit generates a second composite image of the real image and the virtual mask image from which the second region is excluded; and wherein the display unit displays the second composite image.

4. The image processing apparatus according to claim 1, wherein the region extraction unit extracts pixels which have a color which is indicated by the extraction parameter from pixels which constitute the real image as the region.

5. The image processing apparatus according to claim 1, wherein the display unit alternately displays the real image and the composite image by switching between the real image and the composite image.

6. The image processing apparatus according to claim 5, wherein the display unit changes a time interval of the switching based on a ratio of the size of the extracted region to the size of the real image.

7. The image processing apparatus according to claim 6, wherein the time interval is changed to a longer time interval when the ratio is changed to a larger ratio, and the time interval is changed to a shorter time interval when the ratio is changed to a smaller ratio.

8. An image processing apparatus, for editing a parameter of extracting a region which is in association with a real space object from a real image, with visualization of both of a border line of a virtual mask image and a border line of the real space object, comprising, the image processing apparatus:

an image acquisition unit configured to acquire a first image obtained by capturing the real space object by a first image-pickup unit, and a second image obtained by capturing the real space object by a second image-pickup unit;

a region extraction unit configured to extract a first region which is associated with the real space object from the first image using an extraction parameter which is set in advance;

a generation unit configured to generate a translucent virtual mask image based on a transparency parameter;

a combining unit configured to generate a first composite image of the first image and the translucent virtual mask image, wherein the translucent virtual mask image has been clipped based on the first region;

a display unit configured to display the first composite image;

an operation input unit configured to input an operation of changing the extraction parameter, after displaying the first composite image by the displaying unit; and a changing unit configured to change the extraction parameter based on the input operation;

wherein the region extraction unit extracts a second region which is associated with the real space object from the second image, using the extraction parameter changed by the changing unit;

wherein the combining unit generates a second composite image of the second image and the translucent virtual mask image wherein, the translucent virtual mask image having been clipped based on the second region; and wherein the display unit displays the second composite image.

9. An image processing method, for editing a parameter of extracting a region which is in association with a real space object from a real image, with visualization of both a border line of a virtual mask image and a border line of the real space object, the image processing method comprising:

acquiring a real image obtained by capturing the real space object;

extracting a region which is associated with the real space object from the real image, using an extraction parameter which is set in advance;

generating a translucent virtual mask image based on a transparency parameter;

generating a composite image of the real image and the translucent virtual mask image, wherein the translucent virtual mask image has been clipped based on the extracted region;

displaying the composite image; and changing the extraction parameter based on an input operation, after displaying the composite image.

10. A non-transitory storage medium in which a program for a computer to execute the method according to claim 9 is stored.

11. An image processing method, for editing a parameter of extracting a region which is in association with a real space object from a real image, with visualization of both a border line of a virtual mask image and a border line of the real space object, the image processing method comprising:

acquiring a first image obtained by capturing the real space object by a first image-pickup unit, and a second image obtained by capturing the real space object by a second image-pickup unit;

extracting a first region which is associated with the real space object from the first image;

generating a translucent virtual mask image based on a transparency parameter;

generating a first composite image of the first image and the virtual mask image, wherein the translucent virtual mask image has been clipped based on the first region;

displaying the first composite image;

inputting an operation of changing the extraction parameter, after displaying the first composite image;

changing the extraction parameter based on the input operation;

extracting a second region which is associated with the real space object from the second image, using the extraction parameter which is changed;

generating a second composite image of the second image and the translucent virtual mask image, wherein the translucent virtual mask has been clipped based on the second region; and displaying the second composite image.

12. A non-transitory storage medium in which a program for a computer to execute the method according to claim 11 is stored.

* * * * *